US011069248B2

(12) United States Patent
Picaut

(10) Patent No.: US 11,069,248 B2
(45) Date of Patent: Jul. 20, 2021

(54) DYNAMIC DETERMINATION METHOD FOR DETERMINING THE POSITION OF A STOPPING POINT OF AN AIRCRAFT ON A LANDING STRIP AND RELATED SYSTEM

(71) Applicant: DASSAULT AVIATION, Paris (FR)

(72) Inventor: Stéphane Picaut, Gradignan (FR)

(73) Assignee: DASSAULT AVIATION, Paris (FR)

( * ) Notice: Subject to any disclaimer, the term of this patent is extended or adjusted under 35 U.S.C. 154(b) by 200 days.

(21) Appl. No.: 16/290,669

(22) Filed: Mar. 1, 2019

(65) Prior Publication Data

US 2019/0279517 A1    Sep. 12, 2019

(30) Foreign Application Priority Data

Mar. 6, 2018 (FR) ..................... 18 00196

(51) Int. Cl.
*G08G 5/02* (2006.01)
*G01C 21/10* (2006.01)
(Continued)

(52) U.S. Cl.
CPC .............. *G08G 5/025* (2013.01); *B60T 8/172* (2013.01); *B60T 8/1703* (2013.01); *G01C 21/10* (2013.01);
(Continued)

(58) Field of Classification Search
None
See application file for complete search history.

(56) References Cited

U.S. PATENT DOCUMENTS 7,586,422 B2 *  9/2009  Goodman ............. B60T 8/1703
                                                    340/945
7,626,513 B2 * 12/2009  Goodman ............. G08G 1/161
                                                    340/945
(Continued)

FOREIGN PATENT DOCUMENTS

FR     2936077 A1    3/2010
FR     2936079 A1    3/2010
FR     2998702 A1    5/2014

OTHER PUBLICATIONS

Search Report for priority application FR1800196.

*Primary Examiner* — Dale W Hilgendorf
*Assistant Examiner* — Alexander C. Bost
(74) *Attorney, Agent, or Firm* — Davidson, Davidson & Kappel, LLC

(57) ABSTRACT

A dynamic determination method for determining the position of a stopping point of an aircraft on a landing strip and related system includes determining a first table of average time from touchdown of the aircraft as a function of the ground speed, based on an average deceleration profile of the aircraft; determining a first deceleration profile adapted to the current conditions, based on an engine thrust computed for each ground speed from the average time determined in the first table; determining a second table of time adapted to the current conditions based on the first deceleration profile; determining a second deceleration profile adapted to the current conditions, based on an engine thrust computed for each ground speed from the time determined in the second table; and computing the position of the stopping point from the second adapted deceleration profile.

18 Claims, 5 Drawing Sheets

(51) Int. Cl.
*G01C 21/20* (2006.01)
*B60T 8/172* (2006.01)
*G08G 5/00* (2006.01)
*G05D 1/00* (2006.01)
*G05D 1/06* (2006.01)
*B60T 8/17* (2006.01)
*G05D 1/02* (2020.01)

(52) U.S. Cl.
CPC ........... *G01C 21/20* (2013.01); *G05D 1/0083* (2013.01); *G05D 1/0676* (2013.01); *G08G 5/0091* (2013.01); *G05D 1/0202* (2013.01); *G08G 5/0021* (2013.01)

(56) References Cited

U.S. PATENT DOCUMENTS

| | | | | |
|---|---|---|---|---|
| 7,818,100 | B2 * | 10/2010 | Goodman | B64C 25/426 701/16 |
| 8,478,460 | B2 * | 7/2013 | Hugues | G08G 5/065 701/16 |
| 8,630,782 | B2 * | 1/2014 | Rado | B64C 25/42 701/80 |
| 8,972,141 | B2 * | 3/2015 | Picaut | B64C 25/426 701/70 |
| 9,428,161 | B2 * | 8/2016 | Metzger, Jr. | B60T 8/1763 |
| 2010/0070115 | A1 * | 3/2010 | Villaume | B64D 45/04 701/18 |
| 2010/0079308 | A1 * | 4/2010 | Fabre | G08G 5/02 340/951 |
| 2011/0144875 | A1 * | 6/2011 | Rado | B60T 8/1703 701/70 |
| 2013/0261920 | A1 * | 10/2013 | Picaut | B64C 25/426 701/70 |
| 2014/0148980 | A1 * | 5/2014 | Le Corre | G08G 5/025 701/16 |
| 2015/0081142 | A1 * | 3/2015 | Henderson | G08G 5/06 701/16 |
| 2015/0120098 | A1 * | 4/2015 | Catalfamo | G08G 5/02 701/16 |
| 2015/0127196 | A1 * | 5/2015 | Ishihara | G01C 23/00 701/16 |
| 2017/0158177 | A1 * | 6/2017 | Sharma | B60T 8/172 |
| 2017/0183086 | A1 * | 6/2017 | Le-Bouedec | G01C 23/00 |
| 2017/0275020 | A1 * | 9/2017 | Charbonnier | B64D 43/00 |
| 2017/0320589 | A1 * | 11/2017 | Moravek | G08G 5/0091 |
| 2018/0208165 | A1 * | 7/2018 | Slatkin | B60T 7/12 |
| 2019/0054906 | A1 * | 2/2019 | Pedapudi | G08G 5/0013 |

* cited by examiner

| Vsol (kt) | Vsol (14) | 160 | 155 | ... | 0 |
|---|---|---|---|---|---|
| $T_{moy}(s)$ | 0 | $T_{moy}(1)$ | $T_{moy}(2)$ | ... | ... |

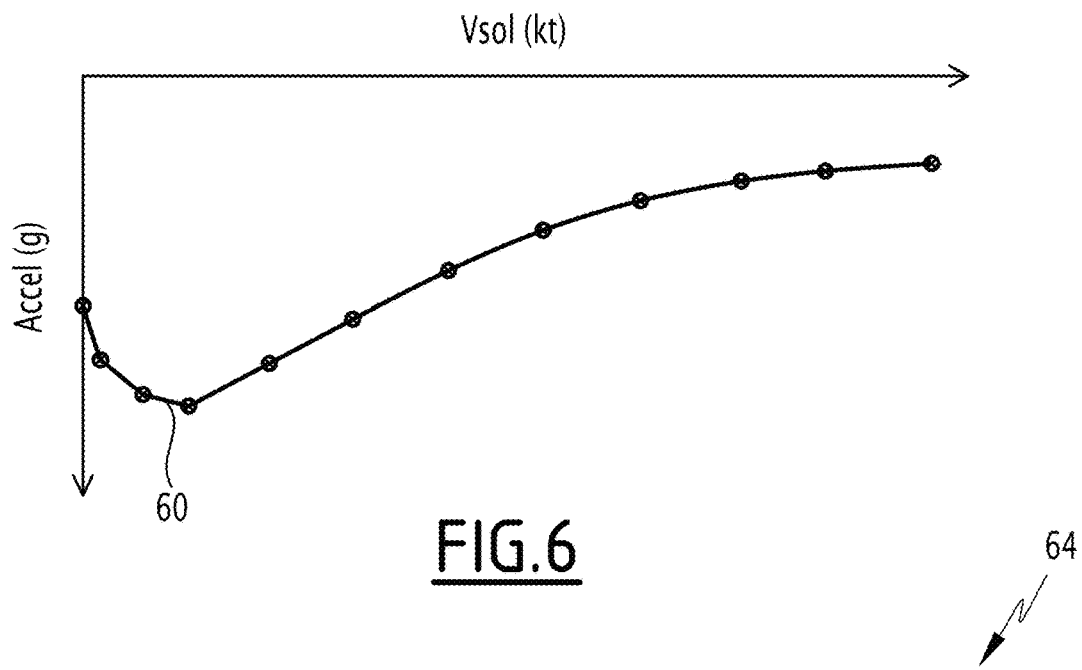
FIG.6
| Vsol (kt) | Vsol (14) | 160 | 155 | ... | 0 |
|---|---|---|---|---|---|
| $T_{moy}(s)$ | 0 | $T_{moy}(1)$ | $T_{moy}(2)$ | ... | ... |
FIG.7
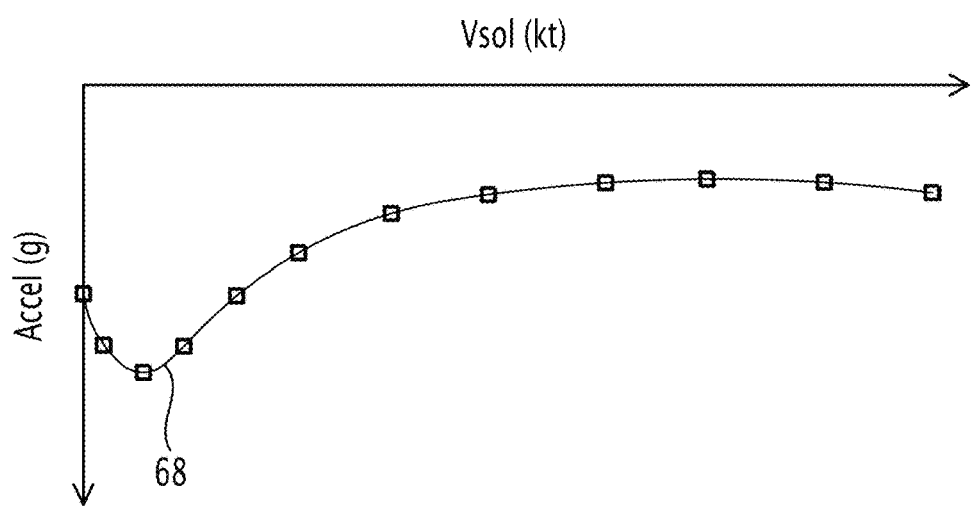
FIG.8

DYNAMIC DETERMINATION METHOD FOR DETERMINING THE POSITION OF A STOPPING POINT OF AN AIRCRAFT ON A LANDING STRIP AND RELATED SYSTEM

The present invention relates to a dynamic determination method for determining a position of the stopping point of an aircraft on a landing strip, implemented by a dynamic determination system for determining the stopping point of the aircraft on the landing strip.

Such a method is intended to be implemented in particular during the landing of the aircraft on the landing strip, in particular with the aim of triggering alerts when a risk of leaving the strip is identified.

BACKGROUND

The landing phase of an aircraft is a critical phase of the flight. Indeed, during this phase, the pilot must manage to stop the aircraft on the landing strip, or must initiate a specific emergency procedure, if he feels that he will not be able to stop the aircraft before the end of the runway. The specific emergency procedure is for example a go around procedure, if the current landing conditions allow it.

In this respect, statistical studies of air traffic accidents having occurred in the last decade on commercial flights show that a majority of accidents take place during landing, and that the primary cause of about 30% of accidents is leaving the landing strip. A significant portion of these accidents are due, during the landing phase, to leaving the landing strips lengthwise.

During the landing phase, precise knowledge of the position of the stopping point of the aircraft is crucial, in order to trigger the alerts correctly when a risk of leaving the landing strip is identified.

However, this phase is very dynamic and requires determining the position of the stopping point with high reactivity.

Elaborate models exist for determining the stopping position with high precision. However, these models have the drawback of being too complex to be integrated into certified computers in the avionics of the aircraft, these computers having limited storage and computing capabilities.

Subsequently, the existing methods, like for example that described in FR 2,998,702, simplify the computation of the stopping distance of the aircraft when the rolling phase has started.

In particular, on the ground, when the braking is established, the position of the stopping point of the aircraft is generally approximated by determining the stopping distance from a constant deceleration, once the braking is established. The constant deceleration in question may be the current deceleration of the aircraft or may come from tables, in which the constant deceleration depends on at least one physical parameter of current conditions at the touchdown point.

Such a method is therefore imprecise by nature and may in some cases lead to false alarms, or even to an incorrect evaluation of a dangerous situation.

SUMMARY OF THE INVENTION

One aim of the present disclosure is therefore to provide a method for determining a stopping point of an aircraft on the ground, with improved precision, while remaining compatible with the computing capabilities of the avionics of the aircraft.

To that end, a method of the aforementioned type is provided, characterized by the following steps:

determining a first table of average time from touchdown of the aircraft on the landing strip as a function of the ground speed, based on an average deceleration profile of the aircraft as a function of the ground speed;

determining a first deceleration profile adapted to the current conditions as a function of the ground speed, based on at least one residual or reversed engine thrust, the engine thrust being computed for each ground speed from the average time corresponding to the ground speed, determined in the first table of average time;

determining a second table of time from touchdown of the aircraft on the landing strip, adapted to the current conditions, as a function of the ground speed, based on the first adapted deceleration profile as a function of the ground speed;

determining a second deceleration profile adapted to the current conditions as a function of the ground speed, based on at least one residual or reversed engine thrust, the engine thrust being computed for each ground speed from the time since touchdown adapted to the current conditions corresponding to the ground speed, determined in the second table of time since touchdown;

computing the position of the stopping point from the second adapted deceleration profile.

The method according to embodiments of the invention may include one or more of the following features, considered alone or according to any technically possible combination(s):

the determination of the first adapted deceleration profile and the determination of the second adapted deceleration profile respectively comprise computing the first adapted deceleration profile and the second adapted deceleration profile for each ground speed value as a function of the drag, the braking force and the mass of the aircraft;

it comprises computing the first adapted deceleration profile and the second adapted deceleration profile for each ground speed value using the equation:

$$Acc = (PM - Tr - FB)/M,$$

where Acc is the deceleration at a given ground speed, PM is the engine thrust at the ground speed, obtained using the first table of average time or the second table of time adapted to the current conditions, Tr is the aerodynamic drag at the ground speed, FB is the braking force at the ground speed and M is the mass of the aircraft;

it comprises computing the residual or reversed engine thrust for each ground speed as a function of the altitude, the wind speed applied on the aircraft, the static temperature of the air, and the time since touchdown, the time since touchdown being obtained in the first table of average time or the second table of time adapted to the current conditions;

it comprises computing the braking force as a function of at least one braking parameter depending on the ground speed, obtained from a computation table of the braking speed depending on the ground speed;

the braking parameter is chosen from among a braking coefficient, and a maximum braking force;

it comprises computing a Mach number as a function of the ground speed and the wind applied on the aircraft, and computing the drag as a function of the Mach number;

it comprises a preliminary step for determining at least one parameter of current conditions upon touchdown chosen from among the mass of the aircraft, the altitude of the landing strip, the wind applied on the aircraft, the outside temperature and/or pressure, and/or a landing strip parameter including the landing strip slope, the first adapted deceleration profile being computed from at least one parameter of current conditions upon touchdown and/or a landing strip parameter;

it comprises determining a landing strip state, chosen from at least a dry strip state and a downgraded strip state, in particular wet or contaminated, the average deceleration profile depending on the strip state;

the aircraft is in the process of rolling on the landing strip, the method comprising measuring the current ground speed, computing the position of the stopping point from the second adapted deceleration profile using the value of the current ground speed;

the aircraft is in flight, the method comprising determining an estimated touchdown point of the aircraft on the landing strip, determining an estimated distance between the estimated touchdown point and an estimated established braking point, and an estimated ground speed at the established braking point, the computation of the position of the stopping point from the second adapted deceleration profile being done from the established braking point estimated using the estimated ground speed at the established braking point.

A dynamic determination system is also provided for determining the position of the stopping point of an aircraft on a landing strip, characterized by:

a module for determining a first table of average time from touchdown of the aircraft on the landing strip as a function of the ground speed, based on an average deceleration profile of the aircraft as a function of the ground speed;

a module for determining a first deceleration profile adapted to the current conditions as a function of the ground speed, based on a residual or reversed engine thrust, the engine thrust being computed for each ground speed from the average time corresponding to the ground speed, determined in the first table of average time;

a module for determining a second table of time from touchdown of the aircraft on the landing strip, adapted to the current conditions, as a function of the ground speed, based on the first adapted deceleration profile as a function of the ground speed;

a module for determining a second deceleration profile adapted to the current conditions as a function of the ground speed, based on a residual or reversed engine thrust, the engine thrust being computed for each ground speed from the time since touchdown adapted to the current conditions corresponding to the ground speed, determined in the second table of time since touchdown;

a module for computing the position of the stopping point from the second adapted deceleration profile.

The system according to embodiments of the invention may comprise one or more of the following features, considered alone or according to any technically possible combination:

the module for the determination of the first adapted deceleration profile and the module for the determination of the second adapted deceleration profile are respectively suitable for computing the first adapted deceleration profile and the second adapted deceleration profile for each ground speed value as a function of the drag, the braking force and the mass of the aircraft;

the module for the determination of the first adapted deceleration profile and the module for the determination of the second adapted deceleration profile are respectively suitable for computing the first adapted deceleration profile and the second adapted deceleration profile for each ground speed value using the equation:

$$Acc=(PM-Tr-FB)/M,$$

where Acc is the deceleration at a given ground speed, PM is the engine thrust at the ground speed, obtained using the first table of average time or the second table of average time, Tr is the aerodynamic drag at the ground speed, FB is the braking force at the ground speed and M is the mass of the aircraft upon touchdown;

it comprises a module for acquiring at least one physical parameter of current conditions upon touchdown chosen from among the mass of the aircraft, the altitude of the landing strip, the wind applied on the aircraft, the outside temperature or pressure, the landing strip slope, the module for determining the first adapted deceleration profile being configured to compute the first adapted determination profile from at least one physical parameter of current conditions upon touchdown obtained from the acquisition module.

BRIEF SUMMARY OF THE DRAWINGS

The invention will be better understood upon reading the following description, provided solely as an example and done in reference to the appended drawings, in which:

FIG. 6 is a view similar to FIG. 3 of a third deceleration profile adapted to the current conditions at the landing strip;

FIG. 7 is a view similar to FIG. 4 of a second table of time from the touchdown point computed as a function of the ground speed from the first deceleration profile adapted to the current landing conditions; and FIG. 8 is a view similar to FIG. 6 of a second deceleration profile intended to compute the position of the stopping point, obtained from the second table.

DETAILED DESCRIPTION

Figure 2:
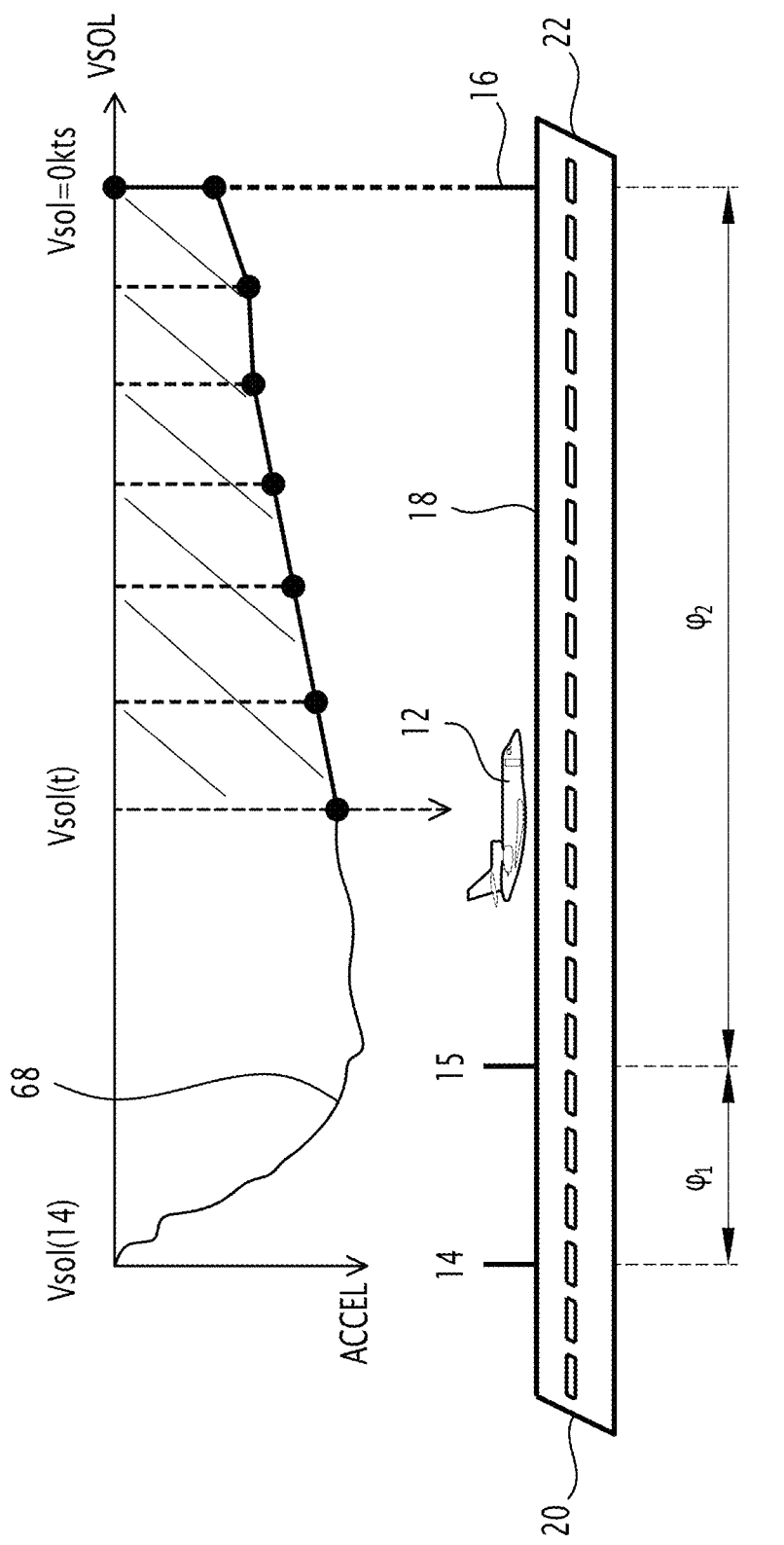
FIG. 2 is a schematic view of an example deceleration profile as a function of the ground speed along a landing strip, taken between the touchdown point, the established braking point, and the stopping point of the aircraft.

FIG. 2 shows the evolution of an aircraft 12 during a phase on the ground from a touchdown point 14 of the wheels on the ground, to a complete stopping point 16 of the aircraft 12.

The phase on the ground includes a first phase $\varphi_1$ during which the deceleration of the aircraft 12 varies until reaching a value corresponding to the braking established in point 15, then a second phase $\varphi_2$ during which the deceleration of the aircraft 12 is the deceleration associated with the established braking, until the latter comes to a complete stop at its stopping point 16.

Figure 1:
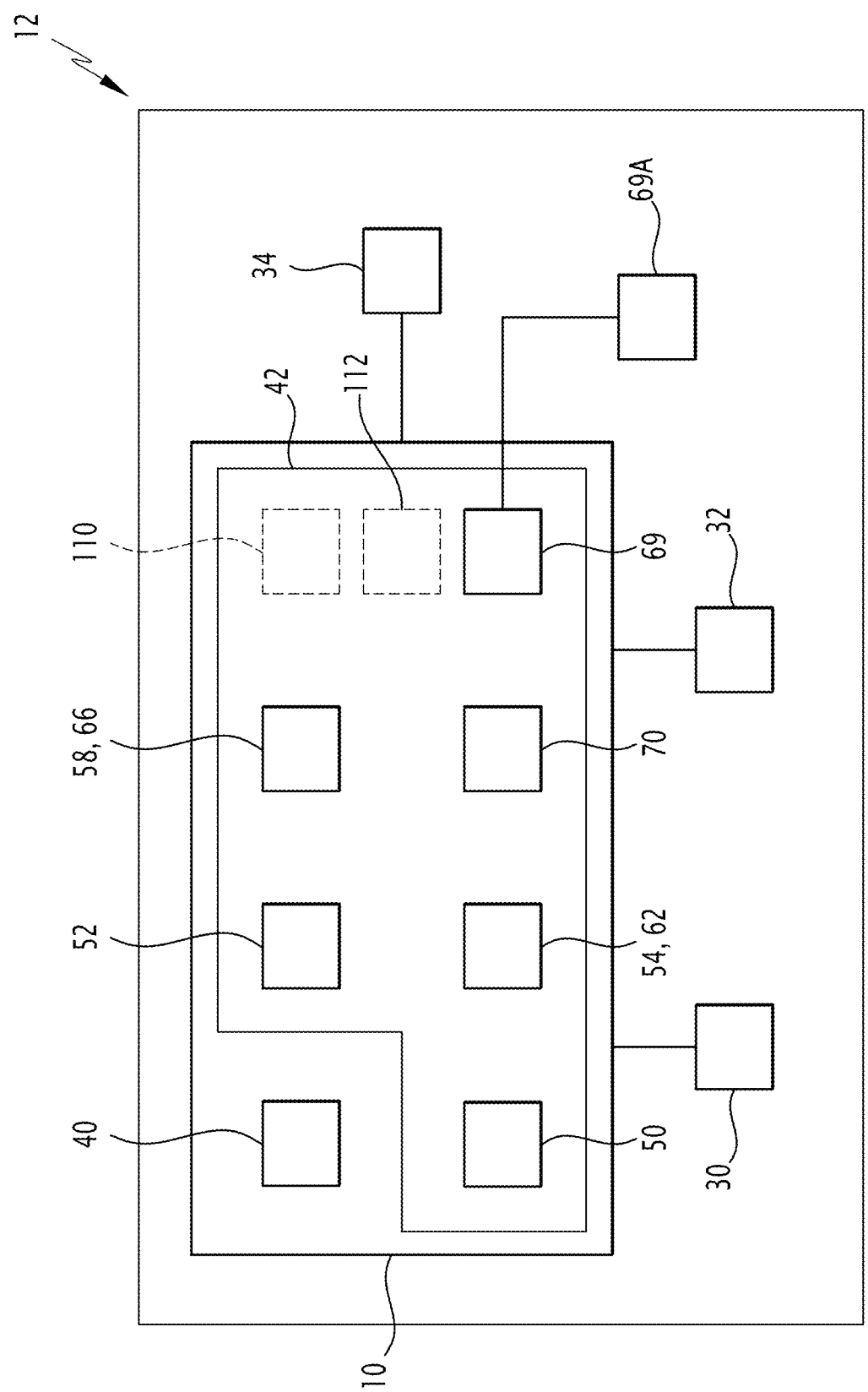
FIG. 1 is a schematic view of an aircraft including a system intended to carry out the method according to an embodiment of the invention.

A first system 10 according to an embodiment of the invention, intended for the dynamic determination of the position of the stopping point 16 of an aircraft 12, is illustrated schematically by FIG. 1. The system 10 is preferably an on-board system satisfying the certification requirements of the aircraft. It is for example integrated into the avionics of the aircraft 12, in particular in the cockpit, or in a ground station for piloting the aircraft 12 remotely.

In reference to FIG. 2, the system 10 is intended to determine, at any moment t at least during the rolling of the aircraft 12 on the landing strip 18, the position of the stopping point 16 of the aircraft 12 on the landing strip 18.

As will be seen later, the geographical position of the stopping point 16 is determined for example by a coordinate along the axis of the landing strip 18, the landing strip 18 having an upstream threshold 20 and a downstream threshold 22.

The system 10 is intended to determine, in real-time, the estimated position of the stopping point 16, as a function of the ground speed at the touchdown point 14 and advantageously as a function of at least one physical parameter of current conditions at the touchdown point 14 chosen from among the mass of the aircraft 12, the altitude of the landing strip 18, the wind applied on the aircraft 12, the temperature, the pressure outside the aircraft 12, and/or the slope of the landing strip 18. The system 10 is intended to provide an alert to the crew when a risk of leaving the strip is identified, based on the estimated position of the stopping point 16.

Aside from the system 10, the aircraft 12 includes, in reference to FIG. 1, a measuring and positioning system 30, and a system 32 for monitoring failures of airplane systems. It further comprises an alert device 34, in particular a display device capable of displaying at least one strip departure alert when a risk of leaving the strip is identified, based on the estimated position of the stopping point 16.

The measuring and positioning system 30 for example includes systems for measuring parameters related to the aircraft and its environment, such as the static temperature, the static pressure, the ground speed and the Mach, the geographical position, the altitude and the attitudes of the aircraft 12.

The measuring and positioning system 30 in particular includes a sensor configured to estimate the touchdown of the wheels, for example a weight sensor applied on a landing gear. The measuring and positioning system 30 includes a sensor configured to estimate the ground speed, for example an accelerometer or a GPS sensor.

It further includes a system for estimating the mass of the aircraft, for example a data acquisition system of a flight parameter computer, a system for determining an altitude of the landing strip 18 and optionally its slope, for example measured by an altitude sensor or obtained from a database.

The system 30 lastly includes a system for determining the wind applied on the aircraft 12 at the destination, the temperature and the pressure at the landing strip 18, either by measuring sensors, or by downloading weather data.

The system 32 is configured to monitor and determine in particular the current state of the systems of the aircraft 12 (in particular the braking systems), taking failures on these systems into account.

The determining system 10 is connected to the measuring and positioning system 30 of the monitoring system 32. It includes at least a processor 40 and a memory 42 containing software modules configured to be run by the processor 40.

In particular, the memory 42 contains an acquisition module 50 for acquiring a ground speed at the touchdown point, and current landing conditions. The memory 42 contains a table 52 including an average deceleration profile 53 over the entire flight envelope of the aircraft 12 as a function of the ground speed, for each of the strip states considered in the system 10.

The memory 42 further includes a module 54 for determining a first table 56 of average time from the touchdown point 14 of the aircraft 12 on the landing strip 18 as a function of the ground speed, based on an average deceleration profile 53 of the aircraft 12 as a function of the ground speed.

The memory 42 further contains a module 58 for determining a first deceleration profile 60 adapted to the current conditions, as a function of the ground speed, based on a residual or reversed engine thrust PM, the engine thrust PM being computed for each ground speed from the average time corresponding to the ground speed, determined in the first table 56 of average time.

The memory 42 also includes a module 62 for determining a second table 64 of time from the touchdown point 14 of the aircraft 12 on the landing strip 18 as a function of the ground speed, based on the first deceleration profile 60 as a function of the ground speed.

The memory 42 further contains a module 66 for determining at least one second deceleration profile 68 adapted to the current conditions, as a function of the ground speed, based on a residual or reversed engine thrust PM, the engine thrust PM being computed for each ground speed from the time corresponding to the ground speed, determined in the second table 64.

In this example, the module 54 and the module 62 are formed by a same time table determination module that is used in a loop to successively determine the first table 56 of average time from touchdown and the second table 64 of time from touchdown, which is more precise than the first table of time.

Likewise, the module 58 and the module 66 are formed by a same profile determination module that is used in a loop to successively determine the first deceleration profile 60 and the second deceleration profile 68.

The memory 42 also contains a module 69 for connecting to a terrain database 69A, the terrain database 69A containing information relative to the length and slope of the landing strip 18.

The memory 42 further contains a module 70 for computing the stopping point 16 based on the second deceleration profile 68 as a function of the ground speed.

The acquisition module 50 is configured to query the measuring and surveillance system 30 to determine the moment at which the touchdown of the wheels occurs, and deduce the ground speed therefrom at the time of touchdown of the wheels. It is configured to obtain information provided by the crew on a state of the landing strip 18, in particular chosen from among a dry state, a wet state, or a contaminated state. It is also configured to obtain information regarding the mass of the aircraft 12 and the slope of the runway 18 at the destination from the terrain database 69A.

It is further configured to determine the altitude, the wind applied on the aircraft 12, the temperature and the static pressure at the landing strip 18.

Before the aircraft 12 touches down, this determination is updated in real time, as a function of the current landing conditions.

After the aircraft 12 touches down, this determination is made upon touchdown of the wheels, and remains frozen until the aircraft 12 stops. Alternatively, the determination is updated during rolling.

Figures 3, 4:
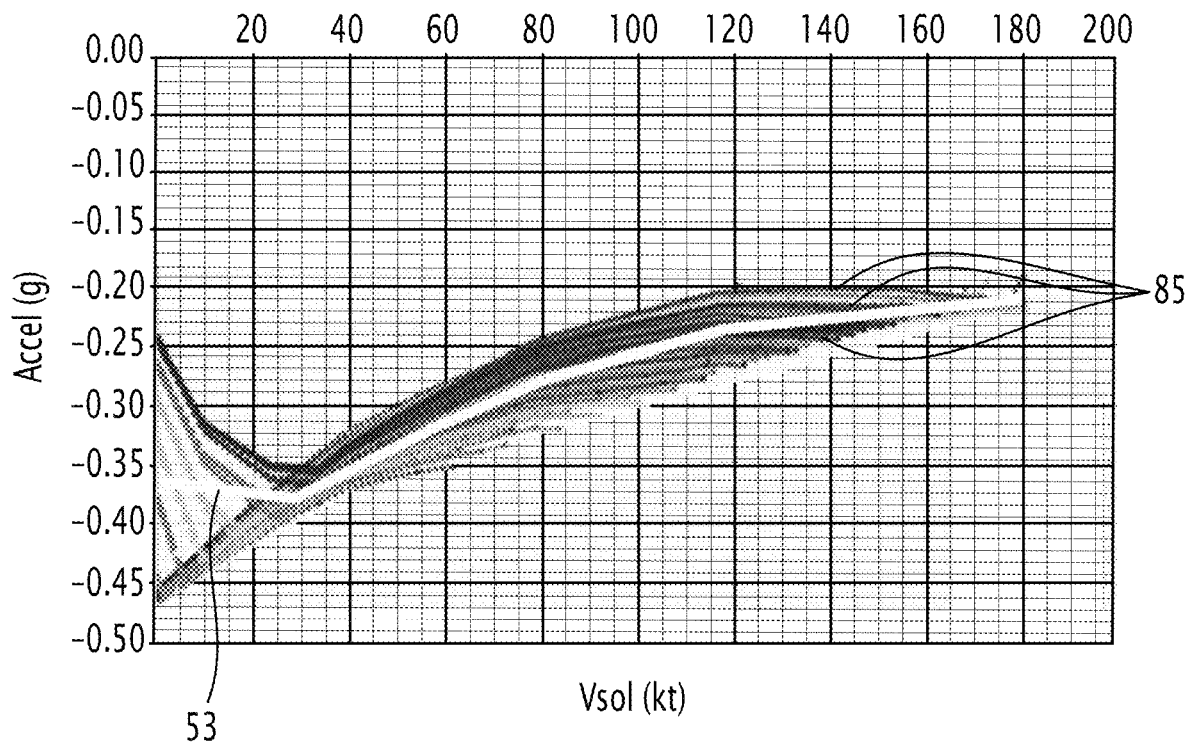
FIG. 3 is a view illustrating an average deceleration profile as a function of the ground speed, established from theoretical or measured deceleration profiles corresponding to the entire flight envelope.
FIG. 4 illustrates an table of average time from the touchdown point computed as a function of the ground speed from the average deceleration profile.

In reference to FIG. 3, the table 52 contains, for each defined state of the landing strip 18, for example for the dry state, the wet state and/or the contaminated state, an average deceleration profile 53 over the entire flight envelope as a function of the ground speed.

This average profile 53 is for example determined by the average of a plurality of deceleration profiles 85 simulated or measured as a function of the ground speed, over the entire certified flight envelope.

The determining module 54 is configured to determine a first match table 56 between the average time $T_{moy}$ elapsed since touchdown of the wheels and the ground speed $V_{sol}$ corresponding to said average time $T_{moy}$, as a function of the average deceleration profile 53 over the entire envelope, recovered from the table 52.

In particular, the determination module 54 is configured to compute, by recurrence, the average time $T_{moy}(i)$ at a plurality of successive decreasing ground speeds $V_{sol}(i)$ from an initial ground speed at the time of touchdown of the wheels, to a nil ground speed.

This determination is for example done by the following equation:

$$T_{moy}(i)=T_{moy}(i-1)+[V_{sol}(i-1)-V_{sol}(i)]/[\text{Acc}(V_{sol}(i))] \quad (1)$$

where $T_{moy}(i)$ is the average time at the increment i corresponding to the ground speed $V_{sol}(i)$, $T_{moy}(i-1)$ is the time at the increment i-1 preceding the increment i and corresponding to the ground speed $V_{sol}(i-1)$, and $\text{Acc}(V_{sol}(i))$ is the deceleration corresponding to the speed $V_{sol}(i)$ taken over the average profile 53.

The determination module 54 is then configured to store the first match table 56 in the memory 42. The average profile 53 is for example determined by a number N of deceleration values Acc as a function of the ground speed $V_{sol}$, with N greater than 5, in particular between 5 and 20.

The determination module 58 is capable of determining a first deceleration profile 60 adapted to the current landing conditions, as a function of the ground speed $V_{sol}$ upon touchdown of the aircraft 12, current landing conditions, and the residual or reversed engine thrust PM applied during the deceleration. The engine thrust PM is computed for each ground speed from the average time corresponding to the ground speed, determined in the first table 56 of average time.

In particular, the determination module 58 is configured to determine the deceleration profile 60 as a function of the ground speed, based on the residual or reversed engine thrust PM, aerodynamic drag Tr, and braking force FB applied on the aircraft 12.

This calculation can be done for a plurality of ground speed values using the founding equation below:

$$\text{Acc}(V_{sol})=(PM-Tr-FB)/M \quad (2)$$

where M is the mass of the aircraft 12.

As indicated above, the engine thrust PM is positive and residual in the case where no thrust reversal occurs, for example because the aircraft has no thrust reversers, or in the case where they are not used. The engine thrust PM is negative and reversed in the case of use of the thrust reversers.

The residual or reversed engine thrust PM is estimated by the determination module 58 taking into account the angle of attack of the aircraft and the pitch angle of the engine.

The determination module 58 is configured to compute the residual or reversed engine thrust PM as a function of the ground speed of the aircraft 12, the time $T_{moy}(i)$ from the touchdown point 14 and physical parameters of current positions, for example the altitude of the aircraft 12, the wind speed $V_v$ applied on the aircraft 12 and the static air temperature SAT measured in Kelvins obtained by the system 30.

To obtain the average time $T_{moy}(i)$ from the touchdown point 14 corresponding to the considered ground speed $V_{sol}$, and use it in the calculation of the engine thrust PM, the determination module 58 uses the first table 56 of average time. Thus, the determination module 58 is configured to determine the residual or reversed engine thrust PM and the deceleration for a plurality of ground speeds, independently of the time from the touchdown point.

The determination module 58 is further configured to calculate the drag Tr as a function of the static pressure of the air $P_s$, of a reference surface $S_r$ corresponding to the surface area of the wings of the aircraft, the Mach number, and a horizontal drag coefficient $C_R$.

The drag is for example calculated using the following equation:

$$Tr=0.7\times P_s\times S_r\times \text{Mach}^2\times C_x \quad (3)$$

The static pressure of the air $P_s$ is measured or estimated by the system 30. The reference surface $S_r$ and the drag coefficient $C_x$ are constants when the aircraft 12 is on the ground.

The determination module 58 is configured to determine the Mach number as a function of the ground speed, the wind speed $V_v$ applied on the aircraft 12 in the axial direction, obtained by the system 30, and the static air temperature SAT measured in Kelvins obtained by the system 30.

The equation for computing the Mach number is for example the following:

$$\text{Mach}=[V_{sol}-V_v]/[39\sqrt{(\text{SAT})}] \quad (4)$$

The determination module 58 is also configured to compute the braking force FB as a function of a friction coefficient CFT of the wheels without braking, a braking coefficient CFG, and an apparent weight PA of the aircraft 12.

In particular, the braking force is computed by the equation:

$$FB=(CFT+\min(CFG;FFG/PA))\times PA \quad (5)$$

CFT being the friction coefficient (in the case of rolling without braking), CFG being the braking coefficient, FFG being the maximum braking force and PA being the apparent weight of the aircraft.

The friction coefficient CFT is considered to be constant for a given aircraft 12 independently of the state of the landing strip 18.

The braking coefficient CFG is obtained from a table of braking coefficients as a function of the ground speed.

The maximum braking force FFG is obtained from a maximum braking force table as a function of the ground speed.

The apparent weight of the aircraft 12 is computed by the following equation:

$$PA=M\times g\times \cos(P_p)-Po-PM_z \quad (6)$$

where M is the mass of the aircraft 12, g is the gravitational acceleration, $P_p$ is the slope of the landing strip 18, Po is the lift of the aircraft and $PM_z$ is the engine thrust along the axis z.

This engine thrust $PM_z$ is computed from the residual or reversed engine thrust PM determined above, taking into account the angle of attack of the aircraft and the pitch angle of the engine.

The determination module 58 is further configured to calculate the lift as a function of the static pressure of the air $P_s$, of a reference surface $S_r$ corresponding to the surface area of the wings of the aircraft, the Mach number, and a vertical drag coefficient $C_z$.

The lift Po is for example computed using the following equation:

$$Po = 0.7 \times Ps \times Sref \times Mach \times Cz \quad (7).$$

Thus, all of the parameters of founding equation (2) above are determined as a function of the ground speed, if needed using the first table 56 of average time.

The first adapted deceleration profile 60 is thus defined by a plurality of deceleration values Acc corresponding to a plurality of ground speed values, for example for a number N of ground speed values greater than 5.

The determining module 62 of the second table 64 is configured to determine a second match table 64 between the time T(i) elapsed since touchdown of the wheels, adapted to the current conditions, and the ground speed $V_{sol}(i)$ corresponding to said time, as a function of the first adapted deceleration profile 60 determined by the determination module 58.

Like the determination module 54, the determination module 62 is configured to compute, by recurrence, this time adapted to the current conditions T(i) at a plurality of successive decreasing ground speeds $V_{sol}(i)$ from an initial ground speed at the time of touchdown, to a nil ground speed.

This determination is for example done by equation (1) above, in which $Acc(V_{sol}(i))$ is the deceleration corresponding to the speed $V_{sol}(i)$ taken at this stage on the first adapted deceleration profile 60.

The determination module 62 is then configured to store the second match table 64 in the memory 42.

The determination module 66 is capable of determining a second deceleration profile 68 adapted more precisely to the current landing conditions, as a function of the ground speed upon touchdown of the aircraft 12, current landing conditions, and the residual or reversed engine thrust PM applied during the deceleration.

In particular, like the module 58, the definition module 66 is configured to determine the second adapted deceleration profile 68 as a function of the ground speed, based on the residual or reversed engine thrust PM, aerodynamic drag Tr, and braking force FB applied on the aircraft 12.

This computation is advantageously done for a plurality of ground speed values $V_{sol}$ using founding equation (2).

The determination module 66 is configured to compute the residual or reversed engine thrust PM, the drag Tr, and the braking force FB using respective equations (3) to (7) set out above.

However, to compute the engine thrust PM, the determination module 66 is configured to use the second table 64 to obtain the time since the touchdown point 14 adapted to the current landing conditions at the chosen ground speed.

Once the second adapted deceleration profile 68 is established, the computation module 70 is configured to compute, at each moment during the rolling on the landing strip 18, the position of the stopping point 16, while performing a double integration of the adapted second deceleration profile 68 between the current ground speed of the aircraft 12 and a nil speed corresponding to stopping of the aircraft.

The computation module 70 is also capable of computing, before rolling on the landing strip 18, the distance between the established beginning of braking 15 and the stopping point 16, by performing a double integration of the second adapted deceleration profile 68 between the ground speed at the established beginning of braking of the aircraft 12 and a nil speed corresponding to stopping of the aircraft.

The second adapted deceleration profile 68 remains the same during the entire deceleration phase until stopping of the aircraft 12. Alternatively, the second adapted deceleration profile 68 is updated again during rolling.

The alert device is configured to generate an excess alert of the downstream threshold 22 of the landing strip 18 based on the position of the stopping point 16 obtained from the computation module 70 and the strip length obtained from the terrain database 69A, when the position of the stopping point is located past the downstream threshold 22.

This alert is for example a visual alert displayed on a viewer and/or an auditory alert.

Figure 5:
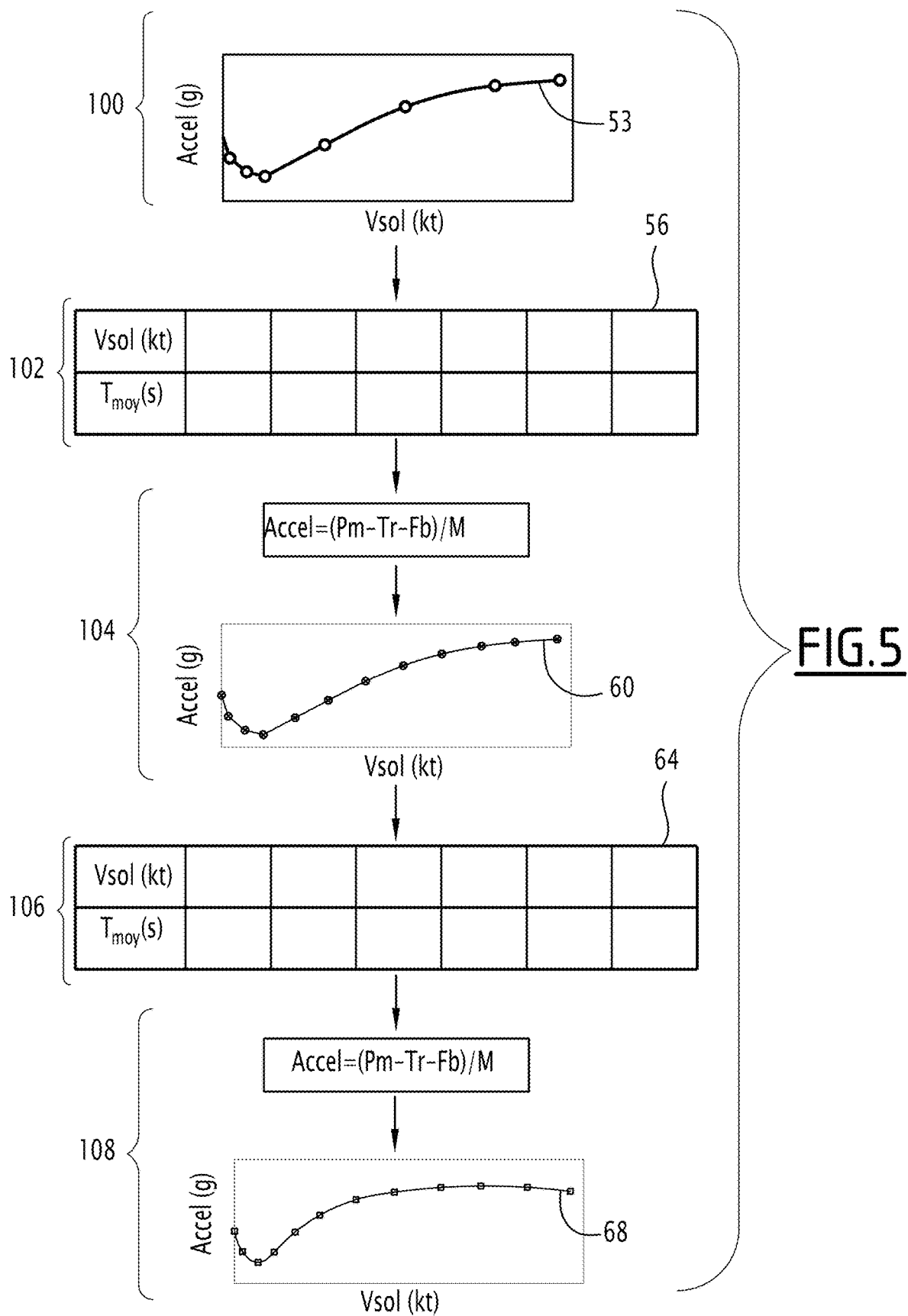
FIG. 5 is a flowchart illustrating the implementation of the inventive method.

A method for estimating the position of the stopping point 16 of an aircraft 12 on a landing strip 18, implemented using the system 10, will now be described in reference to FIG. 5.

Initially, the system 10 detects the touchdown of the wheels, for example using a sensor present in the measuring and positioning system 30.

The acquisition module 50 queries the measuring and surveillance system 30 to determine the ground speed at the time of touchdown of the wheels.

It further obtains information on the current state of the landing strip 18, and on the mass M of the aircraft 12 at the time of touchdown.

The acquisition module 50 further determines the altitude, optionally the slope of the landing strip 18 at the destination, the wind applied on the aircraft 12 at the destination, the temperature and the pressure at the landing strip 18.

In step 100, the acquisition module 50 recovers, in the table 52, the average deceleration profile 53 over the entire envelope, corresponding to the current state of the landing strip 18.

In step 102, the determining module 54 then establishes the first match table 56 between the average time $T_{moy}(i)$ elapsed since touchdown of the wheels and the ground speed $V_{sol}(i)$ corresponding to said average time $T_{moy}(i)$, as a function of the average deceleration profile 53 over the entire envelope, recovered from the table 52.

In particular, the determination module 54 computes, by recurrence, the average time $T_{moy}(i)$ at a plurality of successive decreasing ground speeds $V_{sol}(i)$ from an initial ground speed at the time of touchdown of the wheels, to a nil ground speed. This determination is for example done by equation (1) above.

The determination module 54 next stores the first match table 56 in the memory 42.

In step 104, the determination module 58 then determines a first deceleration profile 60 adapted to the current landing conditions, as a function of the ground speed upon touchdown of the aircraft 12, of current landing conditions, and of the residual or reversed engine thrust PM applied during the deceleration.

In particular, the determination module 58 determines the deceleration profile 60 as a function of the ground speed, based on the residual or reversed engine thrust PM, aerodynamic drag Tr, and braking force FB applied on the aircraft 12.

This computation is done using founding equation (2) above.

The residual or reversed engine thrust PM is estimated by the determining module 58 taking into account angle of attack of the aircraft, the pitch angle of the engine, the ground speed of the aircraft 12, the time $T_{moy}(i)$ from the touchdown point 14 and physical parameters of current positions, for example the altitude of the aircraft 12, the wind speed $V_v$ applied on the aircraft 12 and the static air temperature SAT measured in Kelvins obtained by the system 30.

To obtain the average time $T_{moy}(i)$ from the touchdown point 14 corresponding to the considered ground speed $V_{sol}$, and use it in the calculation of the engine thrust PM, the determination module 58 uses the first table 56 of average time.

The determination module 58 also computes the drag Tr as a function of the static pressure of the air $P_s$, of a reference surface $S_r$ corresponding to the surface area of the wings of the aircraft, the Mach number, and a horizontal drag coefficient $C_R$, advantageously using equation (3) above.

The static pressure of the air $P_s$ is measured or estimated at the touchdown point 14 by the system 30. The reference surface $S_r$ and the horizontal drag coefficient $C_x$ are constants when the aircraft 12 is on the ground. The Mach number is evaluated by equation (4) above.

The determination module 58 computes the braking force FB as a function of a friction coefficient CFT of the wheels without braking, a braking coefficient CFG, and an apparent weight PA of the aircraft 12, advantageously using equation (5) above.

The friction coefficient CFT is considered to be constant for a given aircraft 12 independently of the state of the landing strip 18.

The braking coefficient CFG is obtained from a table of braking coefficients as a function of the ground speed.

The maximum braking force FFG is obtained from a maximum braking force table as a function of the ground speed $V_{sol}$.

The apparent weight of the aircraft 12 is computed by equation (6) above, the lift being computed by equation (7) above.

Thus, all of the parameters of founding equation (2) are determined as a function of the ground speed, if needed using the first table 56 of average time.

The first adapted deceleration profile 60 is thus defined by a plurality of deceleration values Acc corresponding to a plurality of ground speed values, for example for a number N of ground speed values greater than 5.

In step 106, the determining module 62 next determines a second match table 64 between the time T(i) elapsed since touchdown of the wheels, adapted to the current conditions, and the ground speed $V_{sol}(i)$ corresponding to said time, adapted to the current conditions as a function of the first adapted deceleration profile 60 determined by the determination module 58.

Like the determination module 54, the determination module 62 computes, by recurrence, this time adapted to the current conditions T(i) at a plurality of successive decreasing ground speeds $V_{sol}(i)$ from an initial ground speed at the time of touchdown, to a nil ground speed.

This determination is for example done by equation (1) above.

The determination module 62 next stores the second match table 64 in the memory 42.

In step 108, the determination module 66 then determines the second deceleration profile 68 adapted to the current landing conditions, as a function of the ground speed upon touchdown of the aircraft 12, current landing conditions, and the residual or reversed engine thrust PM applied during the deceleration.

In particular, like the module 58, the determination module 66 determines the adapted deceleration profile 68 as a function of the ground speed, based on the residual or reversed engine thrust PM, aerodynamic drag Tr, and braking force FB applied on the aircraft 12.

This computation is advantageously done for a plurality of ground speed values $V_{sol}(i)$ using founding equation (2) above.

The determination module 66 computes the residual or reversed engine thrust PM, the drag Tr, and the braking force FB using respective equations (3) to (7) set out above.

However, to compute the residual or reversed engine thrust PM, the determination module 66 uses the second table 64 to obtain the time since the touchdown point 14 of the wheels at the chosen ground speed.

Once the second deceleration profile 68 is established, the computation module 70 computes, at each moment, the position of the stopping point 16 by computing a distance traveled by the aircraft 12 based on a double integration of the second deceleration profile 68 between the current ground speed of the aircraft 12 and a nil speed corresponding to stopping of the aircraft.

In one embodiment, the second deceleration profile 68 remains the same during the entire deceleration phase until stopping of the aircraft 12. Alternatively, the second deceleration profile 68 is updated during the deceleration phase until stopping of the aircraft 12.

If applicable, the alert device 34 produces an excess alert of the downstream threshold 22 of the landing strip 18.

The system 10 greatly simplifies the assessment of the position of the stopping point 16 by expressing all of the variables needed to compute a deceleration profile 68 adapted to the current conditions, based on the ground speed, using match tables 56, 64 that are easy to establish. The computing power necessary for the computation is therefore greatly decreased, which makes it possible to carry out the computations with computers offering a limited computing power, like the certified avionics computers.

Nevertheless, the computing precision remains very high, offering reliable detection of the stopping point 16.

The system 10 is configured to be implemented during rolling of the aircraft 12 on the landing strip 18. In this case, the computation module 70 performs a double integration of the second deceleration profile 68 between the current ground speed of the aircraft 12, as measured during rolling by the measuring system 30 and a nil speed corresponding to stopping of the aircraft.

In the case where the established braking is not achieved at the moment where the current ground speed is measured, the computation module 70 further advantageously adds an additional distance to the distance computed above using the double integration of the second deceleration profile. The additional distance is determined as a function of the current ground speed and the time to establish the established braking in question as a constant (for example between 0.1 s and 1 s, in particular equal to 0.5 s).

Alternatively, the system 10 is implemented during the flight of the aircraft 12. It then includes a determination module 110 for determining an estimated touchdown point 14 on the landing strip and an estimated ground speed $V_{sol}(14)$ at the touchdown point 14, and a determination module 112 for determining the estimated distance between the estimated touchdown point 14 of the aircraft 12 and an estimated established braking point 15, and the estimated ground speed $V_{sol}(15)$ at the established braking point 15.

This determination module 110 is for example similar to that described in patent application FR 2,998,702. It is configured to dynamically establish a distance traveled by the aircraft 12 during the flight phase, by advantageously estimating the distance traveled by the aircraft 12 during a leveling off phase of the aircraft 12.

From the distance traveled by the aircraft 12 during the flight phase, the position of the estimated touchdown point 14 on the landing strip 18 is established, as well as the estimated ground speed at the touchdown point 14.

The determination module 112 is configured to compute the distance between the estimated touchdown point 14 and the estimated established braking point 15, based on a predetermined constant duration DFE to establish the established braking, which is fixed over the entire flight envelope of the aircraft 12.

The estimated distance D(14–15) between the estimated established braking point 15 and the estimated touchdown point 14 is then advantageously obtained by multiplying the duration DFE by the half-sum of the estimated ground speed $V_{sol}(14)$ at the touchdown point 14 and the estimated ground speed $V_{sol}(15)$ at the established braking point 15, using the equation below:

$$D(14-15)=DFE \times (V_{sol}(14)-V_{sol}(15))/2 \qquad (8)$$

The estimated ground speed $V_{sol}(15)$ at the established braking point 15 is obtained from the estimated ground speed $V_{sol}(14)$ at the touchdown point 14 by subtracting the speed loss experienced during the considered fixed duration DFE. The speed loss is obtained from a speed loss table as a function of the surface state of the landing strip 18 obtained from the acquisition module 50 based on pilot information and slope of the landing strip 18 obtained from the terrain database 69A.

Next, to determine the distance between the established braking point 15 and the stopping point 16 of the aircraft 12, the computation module 70 performs a double integration of the estimated deceleration profile 68 between the estimated ground speed $V_{sol}(15)$ at the established braking point 15, as estimated by the module 112 and a nil speed corresponding to stopping of the aircraft 12, as described above.

The position of the stopping point 16 is known and compared to the position of the threshold 22 of the landing strip 18.

When the touchdown of the wheels is detected, the system 10 freezes the position of the stopping point 16 at the position computed just before the touchdown of the wheels during a constant time delay TE, corresponding to the touchdown of the nose gear, then the establishment of the established braking. This time delay TE is for example between 1 s and 5 s, in particular equal to 3 s.

Next, the position of the stopping point 16 is computed again by the computation module 70 from the measured current speed, by double integration of the second deceleration profile 68, as described above.

In one variant, the system 10 provides the crew of the aircraft 12, in real time, with an indication on the estimated position of the stopping point 16, as obtained from the module 70. This indication is displayed on a viewer of the alert device 34 advantageously in reference to the length of the landing strip 18.

In on variant, the modules of the system 10 are each made in the form of a programmable logic component, such as an FPGA (Field Programmable Gate Array), or in the form of a dedicated integrated circuit, such as an ASIC (Application Specific Integrated Circuit).

What is claimed is:

1. A dynamic method to determine a position of a stopping point of an aircraft on a landing strip, implemented by a dynamic determination system, the method comprising:
   determining a first table of average time elapsed from a touchdown of the aircraft on the landing strip as a function of a ground speed, based on an average deceleration profile of the aircraft as a function of the ground speed;
   determining a first adapted deceleration profile adapted to current conditions, as a function of the ground speed, based on at least one first residual or reversed engine thrust, the at least one first residual or reversed engine thrust being computed for each ground speed, using the average time corresponding to each ground speed, determined in the first table of average time;
   determining a second table of time elapsed from the touchdown of the aircraft on the landing strip, adapted to the current conditions, as a function of the ground speed, based on the first adapted deceleration profile as a function of the ground speed;
   determining a second adapted deceleration profile adapted to the current conditions as a function of the ground speed, based on at least one second residual or reversed engine thrust, the at least one second residual or reversed engine thrust being computed for each ground speed using the time elapsed since touchdown adapted to the current conditions corresponding to each ground speed, determined in the second table of time adapted to the current conditions;
   computing the position of the stopping point from the second adapted deceleration profile; and
   generating a visual alert on a viewer of an alert device and/or auditory alert by the alert device based on the position of the stopping point or generating a display of an indication of the position of stopping point on the viewer of the alert device.

2. The method according to claim 1, wherein the determination of the first adapted deceleration profile and the determination of the second adapted deceleration profile respectively comprise computing the first adapted deceleration profile and the second adapted deceleration profile for each ground speed as a function of a drag, a braking force and a mass of the aircraft.

3. The method according to claim 2, wherein the first adapted deceleration profile and the second adapted deceleration profile are determined for each ground speed value using the equation:

$$Acc=(PM-Tr-FB)/M,$$

where Acc is a deceleration at a given ground speed, PM is an engine thrust at the given ground speed, obtained using the first table of average time or the second table of time adapted to the current conditions, Tr is an aerodynamic drag at the ground speed, FB is a braking force at the given ground speed and M is a mass of the aircraft.

4. The method according to claim 3, further comprising computing at least one of the at least one first residual or reversed engine thrust or the at least one second residual or reversed engine thrust for each ground speed as a function of an altitude, a wind speed applied on the aircraft, a static temperature of the air, and a time since touchdown, the time since touchdown being obtained in the first table of average time or in the second table of time adapted to the current conditions.

5. The method according to claim 2, further comprising computing the braking force as a function of at least one braking parameter depending on the ground speed, the at least one braking parameter being obtained from a computation table of braking speed depending on the ground speed.

6. The method according to claim 5, wherein the at least one braking parameter is chosen from among a braking coefficient, and a maximum braking force.

7. The method according to claim 2, further comprising computing a Mach number as a function of the ground speed and of a wind applied on the aircraft, and computing the drag as a function of the Mach number.

8. The method according claim 1, further comprising a preliminary determining of at least one parameter of current conditions upon touchdown chosen from among a mass of the aircraft, an altitude of the landing strip, a wind applied on the aircraft, an outside temperature and/or pressure, and/or of a landing strip parameter including the landing strip slope, the first adapted deceleration profile being computed from the at least one parameter of current conditions upon touchdown and/or of a landing strip parameter.

9. The method according to claim 1, further comprising determining a landing strip state, chosen from at least a dry strip state and a downgraded strip state, the average deceleration profile depending on the landing strip state.

10. The method according to claim 9, wherein the downgraded strip state is wet or contaminated.

11. The method according to claim 1, wherein the aircraft is in the process of rolling on the landing strip, the method comprising measuring a current ground speed, computing the position of the stopping point from the second adapted deceleration profile using the value of the current ground speed.

12. The method according to claim 1, wherein the aircraft is in flight, the method further comprising determining an estimated touchdown point of the aircraft on the landing strip, determining an estimated distance between the estimated touchdown point and an estimated established braking point, and an estimated ground speed at the established braking point, the computation of the position of the stopping point from the second adapted deceleration profile being done from the established braking point estimated using the estimated ground speed at the established braking point.

13. A dynamic determination system configured to determine a position of a stopping point of an aircraft on a landing strip, comprising:
a first module configured to determine a first table of average time elapsed from touchdown of the aircraft on a landing strip as a function of a ground speed, based on an average deceleration profile of the aircraft as a function of the ground speed;
a second module configured to determine a first adapted deceleration profile adapted to current conditions as a function of the ground speed, based on at least one first residual or reversed engine thrust, the at least one first residual or reversed engine thrust being computed for each ground speed from an average time corresponding to the ground speed, determined in the first table of average time;
a third module configured to determine a second table of time elapsed from touchdown of the aircraft on the landing strip, adapted to the current conditions, as a function of the ground speed, based on the first adapted deceleration profile as a function of the ground speed;
a fourth module configured to determine a second adapted deceleration profile adapted to the current conditions as a function of the ground speed, based on at least one second residual or reversed engine thrust, the at least one second residual or reversed engine thrust being computed for each ground speed from the time elapsed since touchdown adapted to the current conditions corresponding to the ground speed, determined in the second table of time elapsed since touchdown;
a fifth module configured to compute the position of the stopping point from the second adapted deceleration profile; and
an alert device configured for generating a visual alert on a viewer of the alert device and/or auditory alert based on the position of the stopping point or generating a display of an indication of the position of stopping point on the viewer of the alert device.

14. The system according to claim 13, wherein the second module configured to determine the first adapted deceleration profile and the fourth module configured to determine the second adapted deceleration profile are respectively configured to compute the first adapted deceleration profile and the second adapted deceleration profile for each ground speed value as a function of a drag, a braking force and a mass of the aircraft.

15. The system according to claim 14, wherein the second module configured to determine the first adapted deceleration profile and the fourth module configured to determine the second adapted deceleration profile are configured to compute the first adapted deceleration profile and the second adapted deceleration profile for each ground speed using the equation:

$$Acc=(PM-Tr-FB)/M,$$

where Acc is a deceleration at a given ground speed, PM is an engine thrust at the ground speed, obtained using the first table of average time or the second average table of time adapted to the current condition, Tr is an aerodynamic drag at the ground speed, FB is a braking force at the ground speed and M is a mass of the aircraft upon touchdown.

16. The system according to claim 13, further comprising an acquisition module configured to acquire at least one physical parameter of current conditions upon touchdown chosen from among a mass of the aircraft, an altitude of the landing strip, a wind applied on the aircraft, an outside temperature or pressure, a landing strip slope, the second module configured to determine the first adapted deceleration profile being configured to compute the first adapted determination profile from at least one physical parameter of current conditions upon touchdown obtained from the acquisition module.

17. A dynamic method to determine a position of a stopping point of an aircraft on a landing strip, implemented by a dynamic determination system, the method comprising:
determining a first table of average time elapsed from a touchdown of the aircraft on the landing strip as a function of a ground speed, based on an average deceleration profile of the aircraft as a function of the ground speed;
determining a first adapted deceleration profile adapted to current conditions, as a function of the ground speed, based on at least one first residual or reversed engine thrust, the at least one first residual or reversed engine thrust being computed for each ground speed, using the average time corresponding to each ground speed, determined in the first table of average time;

determining a second table of time elapsed from the touchdown of the aircraft on the landing strip, adapted to the current conditions, as a function of the ground speed, based on the first adapted deceleration profile as a function of the ground speed;

determining a second adapted deceleration profile adapted to the current conditions as a function of the ground speed, based on at least one second residual or reversed engine thrust, the at least one second residual or reversed engine thrust being computed for each ground speed using the time elapsed since touchdown adapted to the current conditions corresponding to each ground speed, determined in the second table of time adapted to the current conditions;

computing the position of the stopping point from the second adapted deceleration profile, each average time elapsed from the touchdown of the aircraft on the landing strip as a function of the ground speed in the first table is calculated by using, at each first successive decreasing ground speed, the deceleration at said each first successive ground speed obtained from the average deceleration profile of the aircraft as a function of the ground speed, each time elapsed from a touchdown of the aircraft on the landing strip, adapted to the current conditions, as a function of the ground speed in the second table is calculated by using, at each second successive decreasing ground speed, the deceleration at said each second successive ground speed obtained from the first adapted deceleration profile of the aircraft as a function of the ground speed; and generating a visual alert on a viewer of an alert device and/or auditory alert by the alert device based on the position of the stopping point or generating a display of an indication of the position of stopping point on the viewer of the alert device.

18. The method according to claim 17, wherein the first recurrence is carried out using the equation:

$$Tmoy(i)=Tmoy(i-1)+[Vsol(i-1)-Vsol(i)]/[Acc(Vsol(i))]$$

where Tmoy(i) is said average time at an increment i corresponding to a ground speed Vsol(i), Tmoy(i−1) is the time at an increment i−1 preceding the increment i and corresponding to a ground speed Vsol(i−1), and Acc(Vsol(i)) is the deceleration corresponding to the speed Vsol(i) taken from the average deceleration profile of the aircraft as a function of the ground speed.

* * * * *